July 10, 1973     C. DOENECKE ET AL     3,744,989
METHOD AND APPARATUS FOR REFINING THE METAL
OF A CONSUMABLE ELECTRODE
Filed Nov. 18, 1970

3,744,989
METHOD AND APPARATUS FOR REFINING THE
METAL OF A CONSUMABLE ELECTRODE
Christian Doenecke, Rossdorf, and Karl-Georg Redel, Oberrodenbach, Germany, assignors to Leybold-Heraeus-Verwaltung GmbH, Cologne-Bayental, Germany
Filed Nov. 18, 1970, Ser. No. 90,581
Claims priority, application Germany, Dec. 11, 1969,
P 19 62 135.3
Int. Cl. C22d 7/00; H05b 7/18
U.S. Cl. 75—10 R                                5 Claims

ABSTRACT OF THE DISCLOSURE

In a consumable electrode furnace in which an electrode partly immersed in a slag layer is gradually melted by current passing through the slag to a conductive crucible receiving the slag and the electrode, and an ingot of refined metal collects at the crucible bottom, the bottom wall and upright wall of the crucible are electrically insulated from each other, thereby permitting current to be passed during start-up between the electrode and the bottom wall, and thereafter in a predominantly horizontal path between the electrode and the upright crucible wall. The resulting fluctuating potential between the electrode and the upright crucible wall permits the depth of electrode immersion to be controlled automatically to maintain optimum operating conditions.

---

Figure 1:
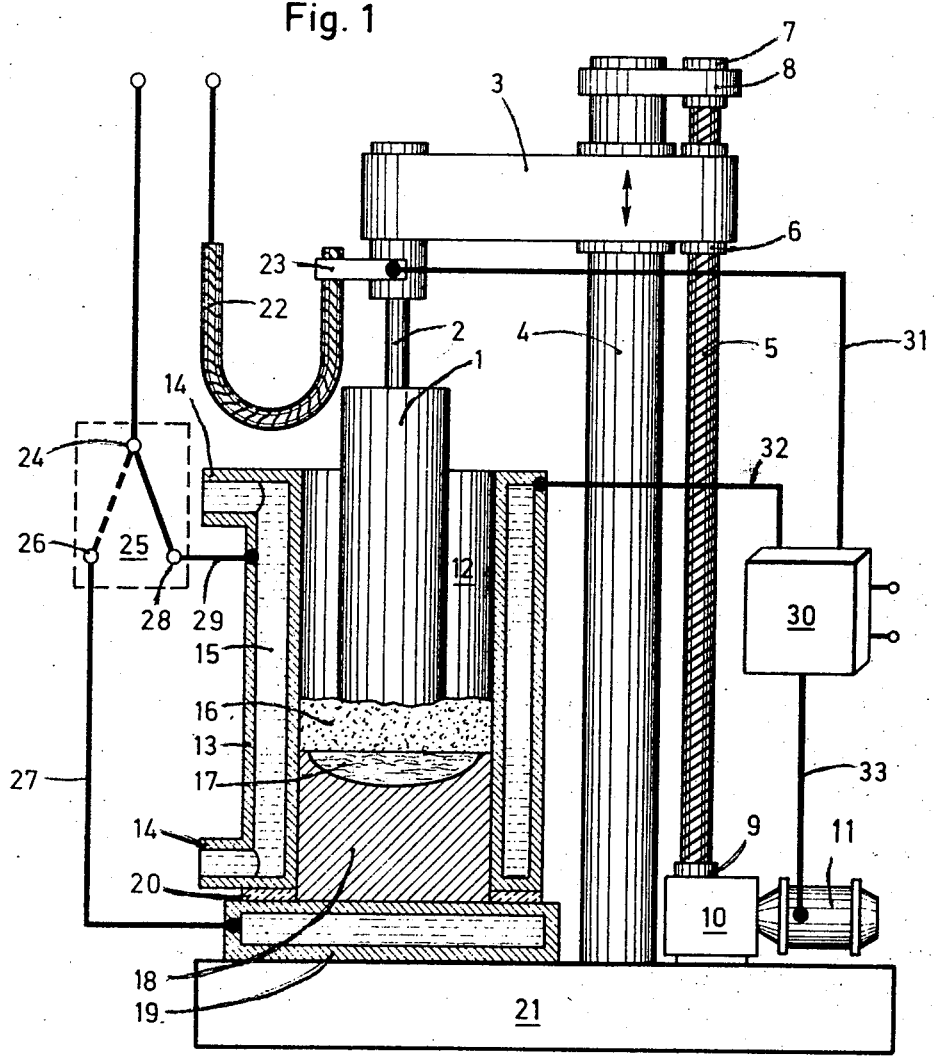

This invention relates to a method of refining the metal of a consumable electrode by passage of current through a slag layer in which the electrode is partly immersed, and to an apparatus for performing the method.

The method with whose improvement this invention is concerned has been been known for some time, for example, from Pat. No. 2,191,479. The molten slag forms a current path, its electrical resistance provides thermal energy for melting the immersed electrode, and it chemically reacts with the descending drops of molten electrode material to refine the same, so that a pool of purified metal collects in the bottom of the crucible holding the slag, and solidifies to an ingot.

As practiced heretofore, the method causes current to flow mainly between the immersed end of the electrode and the bottom wall of the crucible or the ingot and molten metal pool forming thereon. It is inherent in this mode of operation that the slag is hottest along the upright crucible axis, and that the temperature drops steeply from that axis toward the upright crucible wall. When the furnace is operated with direct current, ions are transported from the electrode to the pool of molten metal, and the refined metal is enriched with undesired constituents, such as oxygen. This difficulty can be overcome by alternating current operations at the cost of energy losses by induction and undesired induction heating of conductive elements.

The disadvantages of the known process become particularly serious when large electrodes are to be employed, such as electrodes having a diameter of 1000 mm. or more. The cross section of the electrically conductive portion of the slag increases in the known process in proportion to the square of the electrode diameter, and the effective electric resistance decreases correspondingly. As the electrode dimensions increase, the current thus increases and the voltage decreases at equal energy consumption and melting capacity. The electrical components of the furnace arrangement are costly and complex at very high currents if energy losses in feed lines are to be held within reasonable limits. Moreover, the quality of the refined metal may deteriorate significantly if the depth of the molten slag is increased.

A primary object of the invention is the provision of a method of refining metals by the basically known method outlined above while avoiding the shortcomings of the method as practiced heretofore even when electrodes having a diameter of more than 1000 mm. are employed.

Many of the difficulties encountered heretofore are overcome in the method of this invention by giving the current path from the electrode through the molten slag a predominantly horizontal component, the current flowing mainly along the surface of the slag layer or parallel to the same, and to a portion of the upright crucible wall.

If the spacing between the electrode and the crucible wall is made at least 1.2 times, and preferably more than 1.5 times the height of the slag layer, the current path through the slag is inherently longer than in the predominantly vertical current path of the conventional process. The same amount of thermal energy is generated in the slag at a higher potential difference between the electrode and the crucible wall and with a lower current value, thereby permitting a reduction in the required cross section of the feeder lines.

With predominantly radial current flow in the slag layer, the height of the layer may be reduced without materially affecting the electrical properties of the crucible contents, and the contact area between the hot, molten slag and the water-cooled crucible wall is decreased, with a concomitant saving in energy input and cooling water requirements. The economic advantges of a thinner slag layer are significant.

It will be appreciated that some current flows horizontally in the conventional process, and that a vertical component is not entirely suppressed in the current flow pattern of this invention, however, the vertical component is so much greater in the known process than the horizontal component as to make the latter insignificant, and the opposite relationship is characteristic of the instant invention.

The apparatus employed for producing the desired pattern of current flow differs from the conventional furnace equipped with a consumable electrode by the upwardly open receptacle or crucible in which the electrode is arranged. A body of insulating material is interposed in the apparatus of this invention between the bottom wall and the upright wall of the crucible and electrically insulates the walls from each other. A switch is arranged in circuit between the crucible and the associated terminal of the current supply for alternatively connecting the bottom wall or the upright wall of the crucible to the supply terminal, thereby permitting current to flow between the electrode and the bottom wall during the start-up period, while current normally flows between the electrode and the upright crucible wall and to the end of the melting run.

Figure 2:
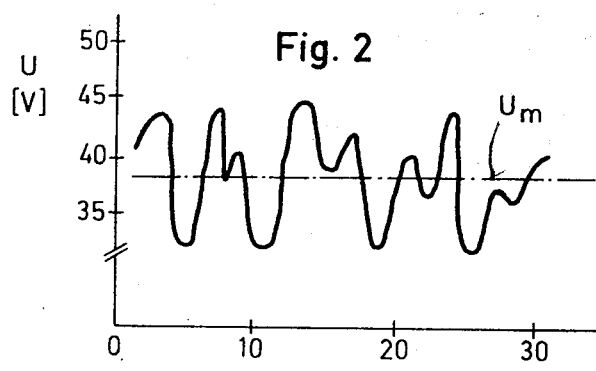

Other features, additional objects, and many of the attendant advantages of this invention will readily be appreciated as the same becomes better understood by reference to the following detailed description of the invention when considered in connection with the appended drawing in which:

FIG. 1 shows an electric furnace arrangement of the invention in elevation and partly in section; and FIG. 2 is a diagram of the potential difference between the electrode and the upright crucible wall in the apparatus of FIG. 1 as a function of time.

Referring now to the drawing in detail, and initially to FIG. 1, there is seen an electric furnace equipped with a consumable electrode 1 mounted on a conductive, vertical holder bar 2 which depends from an arm 3 vertically guided on a heavy, cylindrical column 4. The electrode may be shifted vertically by means of a threaded spindle 5 journaled for rotation about a vertical axis in a bearing 7 of a bracket 8 attached to the top of the column 4 and in a bearing 9 of a gear box 10 attached to a variable-speed electric motor 11. The box 10 contains a speed-reducing transmission, not visible in the drawing, which connects the motor 11 to the spindle 5. The spindle engages an internally threaded bushing 6 fixedly inserted in the arm 3.

In the illustrated position, the cylindrical electrode 1 is received in the upwardly open, coaxially cylindrical cavity 12 of a crucible having a hollow upright wall 13 and a hollow bottom wall 19. Nipples 14 supply and discharge a stream of cooling water 15 for the hollow wall 13, and the bottom wall 19 is similarly equipped for water cooling in a manner known in itself and not specifically shown.

During the normal operation of the apparatus, the lower end of the electrode 1 dips slightly into a layer 16 of molten slag, and electrode material molten mainly by heat transmitted from the slag 16 drips through the slag layer to form a pool 17 of molten, refined metal immediately under the slag, the metal quickly solidifying into a solid ingot 18.

The apparatus described so far does not materially differ from conventional equipment in current use. Contrary to common practice, a flat ring 20 of electrically insulating, heat-resistant material is interposed between the bottom edge of the upright wall 13 and the top face of the bottom wall 19 on which the upright wall 13 rests, the bottom wall 19, the column 4, and the gear box 10 with the motor 11 being mounted on a common heavy base 21.

One of the terminals of the direct-current power supply for the furnace is connected to the electrode 1 by means of a flexible conductor 22 which is fastened to a terminal 23 fixedly attached to the electrode holder rod 2. The other terminal of the power supply, not otherwise shown, is connected with the movable contact 24 of a single-pole, double-throw switch 25. The fixed switch contact 26 is connected with the bottom wall 19 by a conductor 27, and connects the bottom wall to the current supply when the movable contact 24 is in the position shown by a broken line. As indicated by a fully drawn line, the movable contact 24 engages a fixed switch contact 28 throughout most of the operating run in which an electrode is consumed, the contact 28 being connected to the upright crucible wall 13 by a conductor 29.

The potential difference between the electrode 1 and the side wall 13 is sensed and recorded by a control mechanism 30 connected to the electrode holder 2 by a cable 31 and to the upright wall 13 by a cable 32, and the mechanism 30 controls the speed of the motor 11 to maintain a desired depth of immersion of the electrode 1 in the slag layer 16, as described in more detail in the commonly owned application of one of us filed on or about Oct. 1, 1970.

An actual embodiment of the invention was operated under the following conditions:

The crucible had an inner diameter of 1500 mm. and was initially charged with 500 kg. of a coarsely particulate slag having a nominal composition of 40% $CaF_2$, 30% CaO, and 30% $Al_2O_3$. An igniter of steel wool was centered in the slag layer, and an electrode consisting of C=0.85, Si=0.25, Mn=0.30, Cr=4.10, Mo=5.00, Ni=0.20, V=1.80, W=6.30 and having a diameter of 1000 mm. was coaxially mounted as shown in FIG. 1, leaving a gap of 250 mm. width between the electrode and the upright crucible wall.

After the power supply had been started and connected to the bottom wall 19, the electrode was lowered until it touched the igniter. The heat generated by current passage through the steel wool melted enough slag so that current thereafter passed through the melt which ultimately had a height of 110 mm. The electrode was then retracted while the power supply was connected to the upright wall 13 until the potential difference U between the upright wall 13 and the electrode 1 showed the values fluctuating about a mean value $U_m$ of close to 40 volts illustrated in FIG. 2, and the depth of immersion was thereafter controlled automatically by the mechanism 30 to maintain the pattern of potential changes and corresponding current changes about a mean value of 28 to 30 kiloamperes. The energy input was 1050 to 1150 kw.

The slag surface glowed in a practically uniform color from the electrode 1 to the wall 13, thereby indicating that the temperature drop from the electrode to the crucible wall was very small, and much smaller than in the conventional process. The temperature of the slag was therefore practically uniform, and the difference in depth between the central and peripheral portions of the molten metal pool 17 was correspondingly smaller than in the process employed heretofore with a corresponding improvement in the crystal structure of the ingot 18.

Although direct current was passed through the slag layer 16, there was no significant transport of ions through the slag from the electrode 1 to the metal pool 17, and the ingot 18 was not enriched with oxygen. The inherent disadvantages of alternating current operation mentioned above were avoided. The cross sections of the conductors 22, 27, 29 could be made relatively small because the energy needed for melting the metal of the electrode 1 was provided at relatively high voltage and correspondingly low current values.

As long as the height of the slag layer was selected in such a manner that the spacing between the electrode and the upright crucible wall was at least greater than 1.2 times the height of the slag layer, and preferably greater than 1.5 that height, the desired operating conditions could be established simply by withdrawing the electrode 1 from the slag layer 16 until the fluctuations in the potential difference across the slag layer between the upright wall 13 and the electrode 1 reached an amplitude of at least ±4 volts, and preferably more than ±8 volts form the mean value. This condition was then maintained to the end of the run by the control mechanism 30, but it will be appreciated that the electrode position in the apparatus shown in FIG. 1 may be controlled by an operator according to the showing of a recording voltmeter connected to the cables 31, 32, by manually setting the speed of the motor 11 on a rheostat.

With the afore-described slag layer having a height of 110 mm., the dimensions of the crucible and of the electrode had to be selected to make their radial spacing at least 132 mm., but preferably more than 165 mm., and the actual radial gap of 250 mm. was well within the desirable range. We are not aware of a critical upper limit for the spacing between the electrode and the crucible wall, but obvious economic considerations set a practical limit which may differ with local conditions.

The depth of immersion of the electrode should be as small as possible without causing temporary loss of contact and arcing. Under such immersion conditions, the contact resistance between the electrode and the slag varies continuously and produces the fluctuation in the potential between the electrode and the crucible wall which is shown in FIG. 2. The energy input is concentrated at the slag surface directly under the end face of the electrode. The hottest portion of the slag flows radially from under the electrode because of convection currents, but remains at the surface of the slag layer 16 because of its higher temperature and lower specific weight. The temperature drops sufficiently from the slag surface downward to reduce the electrical resistance of the slag to a minimum in the horizontal top layer. When the switch 25 is shifted from the position shown in broken lines to that indicated by a fully drawn line, a predominantly radial and horizontal current flow is quickly established in the slag layer 16. When normal operating conditions according to this invention are reached, the operating voltage reaches a maximum average, and the voltage fluctuates as shown in FIG. 2.

The method of the invention consumes less slag than the known process under otherwise comparable conditions. The height of the molten slag layer need not and should not exceed 30% of the internal diameter of the crucible which determines the greatest horizontal dimension of the slag layer, and is preferably not greater than 15% of the crucible diameter. The optimum height of the slag layer under specific operating conditions depends somewhat on the diameters of the electrode and/or the crucible. With a small crucible, the height of the slag layer should be relatively great. It will be noted that the height of the slag layer in the preceding example is only 7.3% of the crucible diameter.

The fluctuation in the potential illustrated in FIG. 2 does not normally exceed ±10–15 v. from a mean value between 35 and 40 v., and the fluctuations drop below the desirable minimum of ±8 v., and even below ±4 v. when the immersion depth of the electrode 1 exceeds the preferred value, thereby diverting current to a vertical flow pattern, and the operating voltage drops. When the electrode is raised too high, the chart of potential v. time shows sharp peaks and the mean voltage rises as arcing occurs between the bottom face of the electrode and the slag surface.

When the control mechanism 30 was set to a slightly greater immersion depth of the electrode 1 under the otherwise unchanged conditions of the afore-described specific operating example, the color of the slag surface changed visibly within approximately 1 to 2 minutes, the peripheral portions becoming distinctly darker as a clear indication of a relatively steep radial temperature gradient. The recorded mean voltage $U_m$ dropped to approximately 20 v., a value which was maintained practically constantly and without the spikes characteristic of FIG. 2. The current value remained constant at least at about 30 kiloamperes, so that the energy input and the output rate of refined metal were reduced to about one half of the values available under optimum conditions.

When an attempt was made to restore the initial energy input and melting capacity, the voltage had to be raised to 28–29 v., whereby the current increased to 42 kiloamperes, and the experiment had to be abandoned quickly in order to avoid damage to the electrical equipment.

It should be understood, of course, that the foregoing disclosure relates only to preferred embodiments of the invention, and that it is intended to cover all changes and modifications in the examples of the invention herein chosen for the purpose of the disclosure which do not constitute departures from the scope and spirit of the invention as set forth in the appended claims. So the invention is especially not limited to a mold, the bottom portion of which is electrically insulated from the wall portion. The invention may readily be performed in a mold which is a one-piece metal-construction with a power lead-in at any place of the mold, because the voltage-drop in the walls of the mold is neglectible in comparison to the voltage drop in the slag-layer.

What is claimed is:

1. In a method of refining a metal by partly immersing an electrode of the metal in a layer of molten slag received in a conductive receptable and passing current between the electrode and the receptacle through said slag layer under conditions to gradually melt the electrode so that drops of molten metal from the electrode move downwardly through the slag layer, the improvement which comprises passing said current from said electrode to a vertical wall portion of said receptacle in a substantially horizontal path through said slag layer after melting of said electrode has started, said electrode being spaced from said vertical wall portion, said path having a predominant horizontal component in proximity of the upper surface of said slag layer, the depth of said path being substantially confined to the depth of immersion of said electrode, said path and the immersion of said electrode having a substantially shallow depth beneath the surface of said slag layer, the current to said vertical wall portion being substantially equal to the current from said electrode.

2. In a method as set forth in claim 1, the horizontal spacing of said electrode from said wall portion being greater than 1.2 times the height of said slag layer, and the depth of immersion of said electrode in said layer being such that the potential difference between said electrode and said wall portion fluctuates about a mean value by at least ±4 volts when said electrode and said wall portion are connected to a source of direct current.

3. In a method as set forth in claim 2, said spacing being greater than 1.5 times said height, and said potential difference fluctuating by at least ±8 volts about said mean value, the height of said slag layer being not greater than 15 percent of the greatest horizontal dimension thereof.

4. In a method as set forth in claim 2, the height of said slag layer being not greater than 30 percent of the greatest horizontal dimension thereof.

5. In a method as set forth in claim 1, said current being passed from said electrode to a bottom portion of said receptacle during a starting period prior to said passing of current in said path.

References Cited
UNITED STATES PATENTS

| | | | |
|---|---|---|---|
| 3,439,103 | 4/1969 | Holzgruber | 13—9 |
| 3,239,592 | 3/1966 | Snow | 13—9 |
| 3,571,475 | 3/1971 | Holzgruber | 13—9 |
| 3,341,321 | 9/1967 | Morrison | 75—12 |
| 3,495,018 | 2/1970 | Jackson | 13—9 |
| 3,670,089 | 6/1972 | Paton | 75—10 R |
| 3,542,931 | 11/1970 | Hamjian | 13—9 |

HYLAND BIZOT, Primary Examiner

P. D. ROSENBERG, Assistant Examiner

U.S. Cl. X.R.

13—9, 33